(12) United States Patent
Zhong et al.

(10) Patent No.: US 11,922,160 B2
(45) Date of Patent: Mar. 5, 2024

(54) VALIDATED STATE CONTROL IN EDGE COMPUTING

(71) Applicant: Dell Products L.P., Round Rock, TX (US)

(72) Inventors: Haijun Zhong, Shanghai (CN); Xiaojun Wu, Shanghai (CN); Muzhar S. Khokhar, Shrewsbury, MA (US)

(73) Assignee: Dell Products L.P., Round Rock, TX (US)

(*) Notice: Subject to any disclaimer, the term of this patent is extended or adjusted under 35 U.S.C. 154(b) by 100 days.

(21) Appl. No.: 17/586,848

(22) Filed: Jan. 28, 2022

(65) Prior Publication Data

US 2023/0244468 A1 Aug. 3, 2023

(51) Int. Cl.
*G06F 8/65* (2018.01)
*G06F 8/71* (2018.01)
*H04L 67/10* (2022.01)

(52) U.S. Cl.
CPC ............... *G06F 8/65* (2013.01); *H04L 67/10* (2013.01)

(58) Field of Classification Search
CPC .................................. G06F 8/65; H04L 67/10
See application file for complete search history.

(56) References Cited

U.S. PATENT DOCUMENTS

| | | | |
|---|---|---|---|
| 11,422,789 B2* | 8/2022 | Chen | G06F 8/65 |
| 2007/0220507 A1* | 9/2007 | Back | G06F 8/71 717/122 |
| 2011/0099543 A1* | 4/2011 | Thorley | G06F 8/71 717/168 |
| 2018/0081786 A1* | 3/2018 | Berland | G06F 8/71 |
| 2020/0192657 A1* | 6/2020 | Hickman | G06F 9/451 |
| 2021/0240730 A1* | 8/2021 | Polisetty | G06F 16/214 |
| 2022/0326930 A1* | 10/2022 | Nandavar | H04L 67/1097 |

* cited by examiner

*Primary Examiner* — Daxin Wu
(74) *Attorney, Agent, or Firm* — Jackson Walker L.L.P.

(57) ABSTRACT

A method for managing information handling resource versions includes maintaining one or more snapshots of one or more validated release versions for a group of components. Each validated release version indicates a component version for each component in the group. Each component version in a higher validated release version is required to be greater than or equal to a corresponding component version in a lower validated release version. Responsive to identifying an instance of the component group in an non-validated state, disclosed methods identify a lowest validated release version that "covers" the non-validated state, wherein a validated release version covers any state in which no component version is greater than its corresponding component version in the validated release version. The instance of the component group is updated to a validated release version that equals or exceeds the lowest validated version.

12 Claims, 2 Drawing Sheets

VALIDATED STATE CONTROL IN EDGE COMPUTING

TECHNICAL FIELD

The present disclosure relates to systems management and more particularly management of component versioning.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A common problem associated with information handling systems is maintaining consistent and compatible versions of hardware, firmware, and software components, especially when upgrading from one version to another. A similar problem is prevalent in microservice architecture deployments. If there are 100 hardware and software components with an average version number of 10 then the combination of possibility is 10^100, rendering manual approaches to versioning management impractical.

SUMMARY

In accordance with subject matter disclosed in the following description, a method for managing information handling resource versions includes maintaining one or more snapshots of one or more validated release versions for a group of components. Each validated release version indicates a component version for each component in the group. Each component version in a higher validated release version is required to be greater than or equal to a corresponding component version in a lower validated release version. Responsive to identifying an instance of the component group in a non-validated state, disclosed methods identify a lowest validated release version that "covers" the non-validated state, wherein a validated release version covers any state in which no component version is greater than its corresponding component version in the validated release version. The component group may be updated to a validated release version that equals or exceeds the lowest validated version.

Disclosed methods may further include, whenever upgrading a component group of a customer from a first validated state to a second validated state, delivering to the customer only those components whose component versions in the second validated state are higher than their component versions in the first validated state. The one or more snapshots may be maintained on a cloud resource and wherein an edge resource identifies the non-validate state, and still further wherein the method includes sending information indicative of the non-validated state from the edge to the cloud and sending information indicative of the lowest validated release version from the cloud back to the edge resource. In such embodiments, upgrading the instance of the component group comprises sending one or more upgrade versions of one or more components from the cloud to the edge. In addition, responsive to detecting a second instance of the component group in an non-validated state, some embodiments may, instead of upgrading the non-validated configuration, verify the configuration and establish the verified configuration as a new validated release.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figures 1, 2, 3, 4:
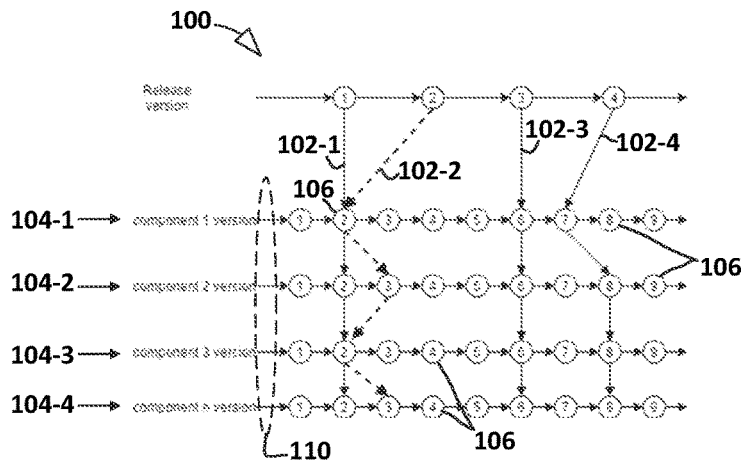
FIG. 1 illustrates validated release information.
FIG. 2 illustrates a different representation of validated release information.
FIG. 3 and FIG. 4 illustrate update packages.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates exemplary validated state information 100 indicating four validated releases or, more simply, validated releases 102-1 through 102-4 of a component group 110 that includes four components represented by component version lines 104-1 through 104-4. Each validated release 102 indicates and includes component version indicators 106 for each component in component group 110. Thus, for example, FIG. 1 conveys that the component version of component 1 (104-1) within validated release version 1 (102-1) was 2, as shown by the component version indicator 106 at the intersection of validated release 102-1 and component version line 104-1.

FIG. 1 reveals, by the absence of any "crossings" of validated releases 102, that the component version indicators 106 for each successive validated release 102 progress monotonically wherein the component version for any component either increases or remains the same from an earlier validated release to a subsequent validated release. In other words, all component versions in a subsequent validated release are greater than or equal to the corresponding component versions in all prior validated releases.

Each validated release 102 in FIG. 1 may be represented, as illustrated in FIG. 2, using a two-column matrix 201 that includes a row 204 for each component in the validated state. The first column in each matrix 201 identifies the component and the second column indicates the corresponding component version.

In at least some instances, when a customer wishes to upgrade from one validated release version to the next, the upgrade may include only those components whose component version in the newer or higher validated release is greater than the corresponding component version in the older or lower version. For example, an upgrade package 301, depicted in FIG. 3, for an upgrade from first validated release version 201-1 (FIG. 2) to second validated release version 201-2 (FIG. 2) includes only two components (C2 and Cn) because the component versions of the remaining components is the same in both validated release versions. In contrast, some validated release upgrades require an upgrade of each component in the component groups. The upgrade from the second validated release version 201-2 (FIG. 2) to the third validated release version 201-3 (FIG. 2) requires an upgrade of each component. Accordingly, the update package 401 for this upgrade, as depicted in FIG. 4, includes all "n" components of the component group. Similarly, the upgrade from validated release version 3 (FIG. 2 201-3) to version 4 (FIG. 2 201-4) requires an upgrade for each component.

Figure 5:
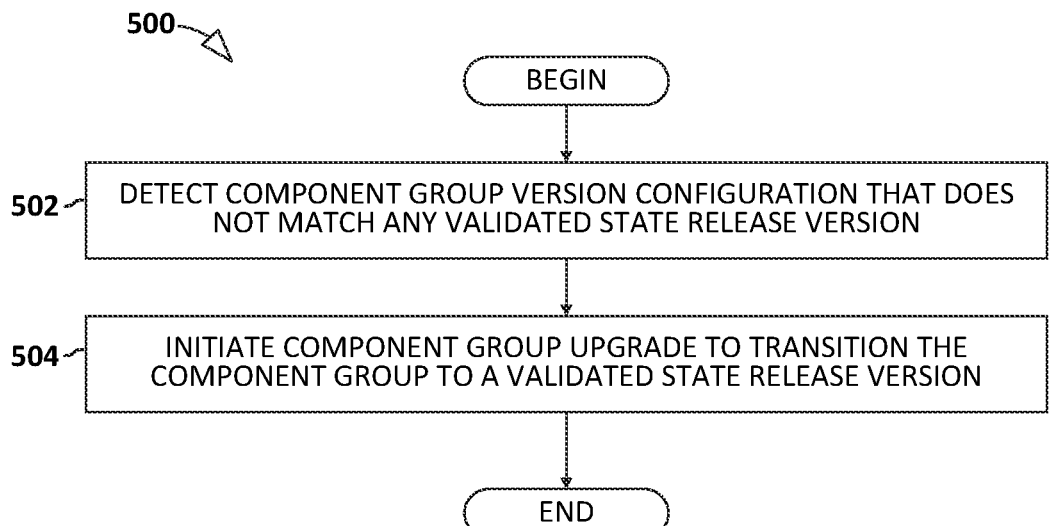
FIG. 5 illustrates a versioning management method.

Referring to FIG. 5, a method 500 for maintaining validly configured component groups is illustrated. The illustrated method detects (block 502) a component group with a version configuration, i.e., a combination of the component versions, that does not match any of validated release version. In response, the illustrated method initiates (block 502) a component group version upgrade to transition the component group to a validated release version. The component group upgrade initiated in block 502 may, in at least some embodiments, upgrade the component group to the lowest sufficient release version. The lowest sufficient release version may refer to the lowest validated release version that "covers" the non-validated version configuration of the component group. A first component group configuration is said to cover a second component group configuration when each component version in the first component group configuration equals or exceeds the corresponding component versions in the second component group configuration.

Figure 6:
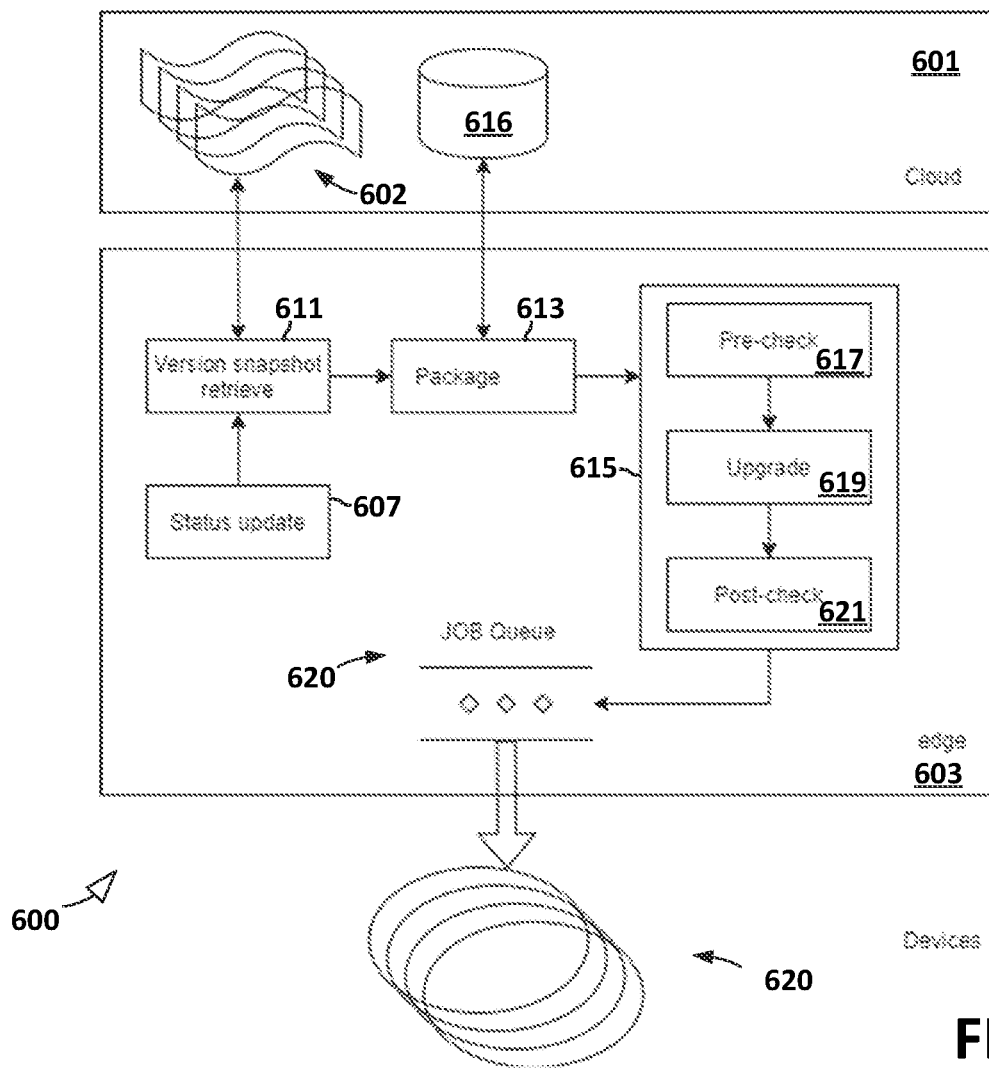
FIG. 6 illustrates a versioning management solution for an edge computing environment.

Referring now to FIG. 6, version management suitable for an IoT environment 600 is depicted. Version snapshots 602 are maintained in cloud 601. Edge node 603 acquires status updates 607 from IoT devices 610. Edge node 603 may send the status updates to cloud 601 and retrieve (block 611)

version snapshots from cloud 601. Based on the status and the version snapshots, edge node 603 can determine appropriate version updates and download corresponding software or firmware packages 613 from a cloud repository 616. Edge node 603 may then create a task 615 including pre-check 617, update 619, and post-check 621 sequence and send task 615 to a job queue 620 for delivery to IoT devices 610.

Another scenario may include employing the cloud side to leverage a large based of edge nodes to identify new validated states. In this scenario, a customer may customize its environment to a previously unknown version state, which can be detected and verified at the edge. This verified configuration can then be sent up to the cloud as a new validated configuration that can then be used by all other edges in the system.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing information handling resource versions, wherein the method includes:
   maintaining, on a cloud resource, one or more snapshots of one or more validated release versions for a group of components, wherein each validated release version indicates a component version for each component in the group, wherein each component version in a higher validated release version is required to be greater than or equal to a corresponding component version in a lower validated release version;
   responsive to identifying, by an edge resource, an instance of the component group in a non-validated state, identifying a lowest validated release version that covers the non-validated state, wherein a validated release version covers any state in which no component version is greater than its corresponding component version in the validated release version;
   upgrading the instance of the component group to a validated release version that equals or exceeds the lowest validated version; and
   sending information indicative of the non-validated state from the edge to the cloud and sending information indicative of the lower validated release version to the edge resource from the cloud resource to the edge resource.

2. The method of claim 1, further comprising:
   whenever upgrading a component group of a customer from a first validated state to a second validated state, delivering to the customer only those components whose component versions in the second validated state are higher than their component versions in the first validated state.

3. The method of claim 1, wherein upgrading the instance of the component group comprises sending one or more upgrade versions of one or more components from the cloud to the edge.

4. The method of claim 1, further comprising, responsive to detecting a second instance of the component group in a non-validated state, verifying the non-validated state and adding the non-validated state as a new validated release version.

5. An information handling system, comprising:
   a central processing unit (CPU);
   a computer readable memory, accessible to the CPU, including processor executable instructions that, when executed by the processor cause the processor to perform operations, wherein the operations comprise:
   maintaining, on a cloud resource, one or more snapshots of one or more validated release versions for a group of components, wherein each validated release version indicates a component version for each component in the group, wherein each component version in a higher validated release version is required to be greater than or equal to a corresponding component version in a lower validated release version;
   responsive to identifying, by an edge resource, an instance of the component group in a non-validated state, identifying a lowest validated release version that covers the non-validated state, wherein a validated release version covers any state in which no component version is greater than its corresponding component version in the validated release version;
   upgrading the instance of the component group to a validated release version that equals or exceeds the lowest validated version; and
   sending information indicative of the non-validated state from the edge to the cloud and sending information indicative of the lower validated release version to the edge resource from the cloud resource to the edge resource.

6. The information handling system of claim 5, further comprising:
   whenever upgrading a component group of a customer from a first validated state to a second validated state, delivering to the customer only those components whose component versions in the second validated state are higher than their component versions in the first validated state.

7. The information handling system of claim 5, wherein upgrading the instance of the component group comprises sending one or more upgrade versions of one or more components from the cloud to the edge.

8. The information handling system of claim 5, further comprising, responsive to detecting a second instance of the component group in a non-validated state, verifying the non-validated state and adding the non-validated state as a new validated release version.

9. A non-transitory computer readable medium including processor executable program instructions that, when executed by a processor, cause the processor to perform operations wherein the operations include:
  maintaining, by an edge resource, one or more snapshots of one or more validated release versions for a group of components, wherein each validated release version indicates a component version for each component in the group, wherein each component version in a higher validated release version is required to be greater than or equal to a corresponding component version in a lower validated release version;
  responsive to identifying an instance of the component group in a non-validated state, identifying a lowest validated release version that covers the non-validated state, wherein a validated release version covers any state in which no component version is greater than its corresponding component version in the validated release version;
  upgrading the instance of the component group to a validated release version that equals or exceeds the lowest validated version; and
  sending information indicative of the non-validated state from the edge to the cloud and sending information indicative of the lower validated release version to the edge resource from the cloud resource to the edge resource.

10. The non-transitory computer readable medium of claim 9, further comprising:
  whenever upgrading a component group of a customer from a first validated state to a second validated state, delivering to the customer only those components whose component versions in the second validated state are higher than their component versions in the first validated state.

11. The non-transitory computer readable medium of claim 9, wherein upgrading the instance of the component group comprises sending one or more upgrade versions of one or more components from the cloud to the edge.

12. The non-transitory computer readable medium of claim 9, further comprising, responsive to detecting a second instance of the component group in a non-validated state, verifying the non-validated state and adding the non-validated state as a new validated release version.

* * * * *